United States Patent
Torres et al.

(10) Patent No.: US 9,856,357 B2
(45) Date of Patent: Jan. 2, 2018

(54) POLYURETHANE RESIN COMPOSITION AND POLYURETHANE COMPOSITE PREPARED FROM THE SAME

(71) Applicant: Covestro Deutschland AG, Leverkusen (DE)

(72) Inventors: Sam Torres, Shanghai (CN); Fei Wu, Yichang (CN); James Chen, Shanghai (CN)

(73) Assignee: COVESTRO DEUTSCHLAND AG, Leverkusen (DE)

(*) Notice: Subject to any disclaimer, the term of this patent is extended or adjusted under 35 U.S.C. 154(b) by 0 days.

(21) Appl. No.: 14/902,720

(22) PCT Filed: Jul. 1, 2014

(86) PCT No.: PCT/EP2014/063970
§ 371 (c)(1),
(2) Date: Jan. 4, 2016

(87) PCT Pub. No.: WO2015/000903
PCT Pub. Date: Jan. 8, 2015

(65) Prior Publication Data
US 2016/0177046 A1    Jun. 23, 2016

(30) Foreign Application Priority Data

Jul. 5, 2013  (CN) .......................... 2013 1 0299707

(51) Int. Cl.
| C08G 18/44 | (2006.01) |
| C08J 9/14 | (2006.01) |
| C08G 18/48 | (2006.01) |
| C08J 5/04 | (2006.01) |
| B29C 70/04 | (2006.01) |
| C08J 9/00 | (2006.01) |
| C08J 9/12 | (2006.01) |
| B29K 75/00 | (2006.01) |

(52) U.S. Cl.
CPC .............. *C08J 9/147* (2013.01); *B29C 70/04* (2013.01); *C08G 18/44* (2013.01); *C08G 18/4866* (2013.01); *C08J 5/04* (2013.01); *C08J 5/043* (2013.01); *C08J 9/0066* (2013.01); *C08J 9/122* (2013.01); *C08J 9/125* (2013.01); *C08J 9/141* (2013.01); *C08J 9/144* (2013.01); *B29K 2075/00* (2013.01); *C08J 2375/00* (2013.01); *C08J 2375/08* (2013.01)

(58) Field of Classification Search
CPC . C08J 9/147; C08J 9/122; C08J 9/0066; C08J 9/141; C08J 9/144; C08J 2375/08; C08G 18/44; C08G 18/4866
See application file for complete search history.

(56) References Cited

U.S. PATENT DOCUMENTS

| 3,404,109 A | 10/1968 | Milgrom |
| 3,829,505 A | 8/1974 | Herold |
| 3,941,849 A | 3/1976 | Herold |
| 5,158,922 A | 10/1992 | Hinney et al. |
| 8,324,419 B2 | 12/2012 | Mijolovic et al. |
| 8,402,652 B2 | 3/2013 | Bakhuis et al. |
| 2009/0306239 A1 | 12/2009 | Mijolovic et al. |
| 2012/0245286 A1 | 9/2012 | Younes |
| 2013/0296450 A1 | 11/2013 | Hofmann et al. |
| 2015/0232606 A1 | 8/2015 | Wamprecht et al. |
| 2015/0299374 A1 | 10/2015 | Hofmann et al. |

FOREIGN PATENT DOCUMENTS

| CN | 1400229 A | 3/2003 | |
| CN | 1954995 A | 5/2007 | |
| CN | 101857668 A | 10/2010 | |
| DE | 102008000478 A1 | 9/2008 | |
| DE | 102012218846 A1 * | 4/2014 | ............ C08G 18/44 |
| EP | 0 222 453 A2 | 5/1987 | |
| EP | 2115032 A1 | 11/2009 | |
| EP | 2730598 A1 | 5/2014 | |
| WO | WO-2008/013731 A1 | 1/2008 | |
| WO | WO-2008092767 A1 | 8/2008 | |
| WO | WO-2010/115567 A1 | 10/2010 | |
| WO | WO-2012080192 A1 | 6/2012 | |
| WO | WO-2014060348 A2 | 4/2014 | |
| WO | WO-2014072336 A1 | 5/2014 | |

OTHER PUBLICATIONS

English Translation of Document N.*
International Search Report for PCT/EP2014/063970 dated Sep. 5, 2014.

* cited by examiner

*Primary Examiner* — Michael L Leonard
(74) *Attorney, Agent, or Firm* — K&L Gates LLP

(57) ABSTRACT

The present invention relates to a polyurethane resin composition for preparing a polyurethane composite, having (a) an organic polyisocyanate; (b) an isocyanate-reactive component having (b1) one or more polyether carbonate polyols which are prepared by addition of carbon dioxide and alkylene oxides onto starters having active hydrogen using DMC catalysts, and (b2) one or more polyols which have a functionality of 2-6 and are selected from polyether polyols, polyester polyols, polymer polyols or combinations thereof; and (c) a blowing agent having an amount of 0-0.2 wt. % based on 100% by weight of the isocyanate-reactive component (b).

14 Claims, No Drawings

POLYURETHANE RESIN COMPOSITION AND POLYURETHANE COMPOSITE PREPARED FROM THE SAME

CROSS-REFERENCE TO RELATED APPLICATIONS

This application is a national stage application (under 35 U.S.C. §371) of PCT/EP2014/063970, filed Jul. 1, 2014, which claims benefit of Chinese Application No. 201310299707.2, filed Jul. 5, 2013, both of which are incorporated herein by reference in their entirety.

TECHNICAL FIELD

The invention relates to a polyurethane resin composition, particularly to a polyurethane resin composition comprising a polyether carbonate polyol. The invention further relates to a polyurethane composite prepared from said polyurethane resin composition and a method for preparing said polyurethane composite.

BACKGROUND ART

Polyurethane resin matrices are a type of highly cross-linked polymer materials which are often used for preparing polyurethane composite materials. Compared to traditional unsaturated resin and vinyl ester resin systems, polyurethane resins are characterized by excellent fatigue resistance and chemical corrosion resistance, superior impact toughness, and absence of styrene, etc. Hence, they are used in the composite material field more and more frequently.

Generally, a polyurethane composite material prepared from a polyurethane resin matrix having good mechanical properties also has good mechanical properties. Due to their lower cross-linking density than traditional unsaturated resins and vinyl resins, the mechanical properties of polyurethane resin matrices are inferior to those of the unsaturated resins and vinyl resins. However, if the cross-linking density of a polyurethane resin matrix is increased, the reactivity of the resin will be enhanced accordingly, resulting in shortened molding process time of a polyurethane composite, which is undesirable for the preparation of the polyurethane composite. Thus, an effort has ever been in existence in the industry to develop a process capable of improving the mechanical properties of a polyurethane resin matrix with no impact on its reactivity.

Polyether carbonate polyols, which are a class of polyols made from carbon dioxide and epoxides, can not only reduce the demand on petrochemical raw materials, but also realize environmentally friendly utilization of carbon dioxide, a "greenhouse gas". Therefore, they are expected to replace traditional polyether polyols. Unfortunately, polyether carbonate polyols are used only in limited fields. For example, US20090306239 discloses a polyurethane microcellular elastomer prepared from a polyether carbonate polyol, and WO2010115567 discloses a polyurethane elastomer prepared from a polyether carbonate polyol. Therefore, it will be advantageous to develop a polyurethane material using a polyurethane carbonate polyol in order to expand the application field of polyether carbonate.

SUMMARY OF THE INVENTION

In one aspect, the invention provides a polyurethane resin composition for preparing a polyurethane composite, comprising:

(a) an organic polyisocyanate;
(b) an isocyanate-reactive component comprising
(b1) 5-50 wt. % of one or more polyether carbonate polyols, based on 100% by weight of the isocyanate-reactive component, which is prepared by addition of carbon dioxide and alkylene oxides onto a starter comprising active hydrogen atom(s) in the presence of a dual metal cyanide (DMC) catalyst, wherein the polyol has a functionality of 2-6, a hydroxyl number in the range from 10 to 500 mg KOH/g, and a content of incorporated carbon dioxide in the form of carbonate units of 3-70 wt. % based on 100% by weight of the polyether carbonate polyol; and
(c) 0-0.2 wt. % of a blowing agent, based on 100% by weight of the isocyanate-reactive component (b).

In an embodiment of the invention, the blowing agent is selected from the group consisting of water, chlorodifluoromethane, dichloromonofluoromethane, dichlorodifluoromethane, trichloromonofluoromethane, butane, pentane, cyclopentane, hexane, cyclohexane, heptane, air, $CO_2$, $N_2$ or combinations thereof.

In another embodiment of the invention, the polyether carbonate polyol has a content of incorporated carbon dioxide in the form of carbonate units of 5-35 wt. %, based on 100% by weight of the polyether carbonate polyol.

In still another embodiment of the invention, the polyurethane resin composition has a gel time of from 40 seconds to 48 hours.

In yet another embodiment of the invention, the polyether carbonate polyol has a functionality of 2-4.

In yet another embodiment of the invention, the polyether carbonate polyol has a hydroxyl number of 10-400 mg KOH/g.

In yet another embodiment of the invention, the blowing agent has an amount of 0-0.05 wt. %, based on 100% by weight of the isocyanate-reactive component (b).

In yet another embodiment of the invention, the starter comprising active hydrogen atom(s) is selected from the group consisting of methanol, ethanol, propanol, butanol, pentanol, hexanol, $C_7$-$C_{30}$ monohydric alcohol, ethylene glycol, diethylene glycol, triethylene glycol, propylene glycol, dipropylene glycol, tripropylene glycol, neopentyl glycol, 1,3-propanediol, 1,4-butanediol, 1,2-butanediol, 1,3-butanediol, 2,3-butanediol, 1,6-hexanediol, water, glycerin, trimethylolpropane, trimethylolethane, pentaerythritol, α-methylglucoside, sorbitol, mannitol, hydroxymethylglucoside, hydroxypropylglucoside, sucrose, 1,4-cyclohexanediol, cyclohexanedimethanol, hydroquinone, resorcinol and alkoxylates thereof. Preferably, the starter comprising active hydrogen atom(s) is selected from the group consisting of ethylene glycol, propylene glycol, glycerin and trimethylolpropane or combinations thereof.

In yet another embodiment of the invention, the alkylene oxide is selected from the group consisting of ethylene oxide, propylene oxide, 1,2-butylene oxide, 2,3-butylene oxide, isobutylene oxide, epichlorohydrin, cyclohexene oxide, styrene oxide, polycarboxylic anhydrides and lactones or combinations thereof. Preferably, the alkylene oxide is selected from the group consisting of ethylene oxide, propylene oxide, or a combination thereof.

In yet another embodiment of the invention, the component (b) further comprises (b2) one or more polyether polyols.

In yet another embodiment of the invention, the polyurethane resin composition further comprises one or more components selected from the group consisting of: chain extenders, fillers, internal mold releasing agents, flame retardants, smoke suppressants, dyes, pigments, antistatic agents, antioxidants, UV stabilizers, diluents, antifoaming agents, coupling agents, surface wetting agents, leveling agents, dewatering agents, catalysts, molecular sieves or combinations thereof.

In another aspect, the invention provides polyurethane composite, comprising (I) a polyurethane resin matrix prepared from the polyurethane resin composition described above, wherein the polyurethane resin matrix has a density of 0.8-1.2 kg/m$^3$; and (II) a reinforcement material.

In an embodiment of the invention, the polyurethane composite is prepared by a process of infusion, pultrusion, filament winding, resin transfer molding, hand lay-up, compression molding, spray up molding, continuous lamination, or combinations thereof.

In an embodiment of the invention, the reinforcement material is selected from the group consisting of glass fibers, carbon fibers, polyester fibers, natural fibers, aramid fibers, nylon fibers, basalt fibers, boron fibers, silicon carbide fibers, asbestos fibers, whiskers, hard particles, metal wires, or combinations thereof.

In an embodiment of the invention, the polyurethane composite is a wind turbine blade, a yacht shell, a window frame, a door frame, a ladder frame, a telegraph pole cross arm, a tent pole, a solar cell frame, a solar cell backsheet, a radome, a highway guard rail, a floor board, a pipe, a telegraph pole, an auto trunk, a luggage holder, an engine cover, a golf club, a tennis pole, a badminton pole, a bicycle frame, a surfboard, or a snowboard.

In still another aspect, the invention provides a process of preparing polyurethane composite which comprises a polyurethane resin matrix and a reinforcement material, comprising the steps of:

(I) impregnating the reinforcement material with the polyurethane resin composition described above; and (II) reacting the polyurethane resin composition described above to obtain the polyurethane resin matrix.

In still another aspect, the invention provides a use of the polyurethane resin composition described above for preparing the polyurethane composite.

DETAILED DESCRIPTION OF THE INVENTION

The polyurethane resin composition provided by the invention replaces a conventional polyether polyol partially with a polyether carbonate polyol to reduce the amount of the conventional polyether polyol used. Additionally, the polyurethane resin composition of the invention has a suitable pot life, such that polyurethane composite may be prepared by a compositing process, such as infusion, pultrusion, filament winding and the like, and the resultant polyurethane composite has a good mechanical strength and a good elongation at break.

Polyurethane Resin Composition

In one aspect, the invention relates to a polyurethane resin composition for preparing a polyurethane composite, comprising:

(a) an organic polyisocyanate;

(b) an isocyanate-reactive component comprising (b1) 5-50 wt. % of one or more polyether carbonate polyols, based on 100% by weight of the isocyanate-reactive component, which is prepared by addition of carbon dioxide and an alkylene oxide onto a starter comprising active hydrogen atom(s) in the presence of a DMC catalyst, wherein said polyol has a functionality of 2-6, a hydroxyl number in the range from 10 to 500 mg KOH/g, and a content of incorporated carbon dioxide in the form of carbonate units of 3-70 wt. %; and (c) 0-0.2 wt. % of a blowing agent, based on 100% by weight of the isocyanate-reactive component (b).

Organic polyisocyanates that may be used as the component (a) of the polyurethane resin composition according to the invention include organic diisocyanates which may be any aliphatic, alicyclic or aromatic isocyanates known for use in the preparation of polyurethanes. Examples thereof include but not limited to 2,2'-diphenylmethane diisocyanate, 2,4-diphenylmethane diisocyanate and 4,4'-diphenylmethane diisocyanate; mixtures of monomeric diphenylmethane diisocyanates and diphenylmethane diisocyanate homologs having more rings (polymerized MDI); isophorone diisocyanate (IPDI) or oligomers thereof; toluene diisocyanates (TDI), e.g. toluene diisocyanate isomers such as toluene-2,4-diisocyanate or toluene-2,6-diisocyanate, or mixtures thereof; tetramethylene diisocyanate or oligomers thereof; hexamethylene diisocyanate (HDI) or oligomers thereof; naphthalene diisocyanates (NDI) or mixtures thereof.

In a preferred embodiment of the invention, the organic polyisocyanates include those based on diphenylmethane diisocyanate, particularly those comprising polymerized MDI. The functionality of the organic polyisocyanate is preferably 2.0-2.9, more preferably 2.1-2.8. The viscosity of the organic polyisocyanate is preferably 5-600 mPas, more preferably 10-300 mPas as measured at 25° C. according to DIN 53019-1-3.

The organic polyisocyanate may also be used in the form of a prepolymer of a polyisocyanate. The polyisocyanate prepolymer may be obtained by reacting an excessive amount of the organic polyisocyanate described above with a compound having at least two isocyanate-reactive groups under a temperature of 30-100° C., preferably about 80° C. The polyisocyanate prepolymer of the invention preferably has an NCO content of 20-33 wt. %, more preferably 25-32 wt. %. The compounds having at least two isocyanate-reactive groups are well known to those skilled in the art. For example, they are described in Chapter 3.1, Plastics Handbook ("Kunststoffhandbuch, 7, Polyurethanes", Carl Hanser-Verlag, 3rd Ed., 1993), which is incorporated herein in its entity by reference.

The isocyanate-reactive component in the polyurethane resin composition of the invention comprises one or more polyether carbonate polyols (b1). In an embodiment of the invention, the polyether carbonate polyol has an amount of 5-50 wt. %, preferably 10-30 wt. %, based on 100% by weight of the isocyanate-reactive component.

In the invention, the polyether carbonate polyol has a content of incorporated carbon dioxide in the form of carbonate units of 3-70 wt. %, preferably 5-35 wt. %, more preferably 10-28 wt. %. In the invention, the polyether carbonate polyol has a hydroxyl number in the range from 10 to 500 mg KOH/g, preferably in the range from 10 to 400 mgKOH/g. The polyether carbonate polyol has a hydroxyl functionality of 2-6, preferably 1.90-2.30, more preferably 1.93-2.20, still preferably 1.96-2.05, most preferably 1.98-2.02.

Generally, the alkylene oxides for preparing the polyether carbonate polyol have 2-24 carbon atoms, the examples of which include but not limited to ethylene oxide, propylene oxide, 1,2-butylene oxide, 2,3-butylene oxide, 2-methyl-1, 2-propylene oxide, 1,2-pentene oxide, 2,3-pentene oxide, 2-methyl-1,2-butylene oxide, 3-methyl-1,2-butylene oxide, 1,2-hexene oxide, 2,3-hexene oxide, 3,4-hexene oxide, 2-methyl-1,2-pentene oxide, 4-methyl-1,2-pentene oxide, 2-ethyl-1,2-butylene oxide, 1,2-heptene oxide, 1,2-octene oxide, 1,2-nonene oxide, 1,2-decene oxide, cyclopentene oxide, cyclohexene oxide, cycloheptene oxide, cyclooctene oxide, tetrahydrofuran, phenylethylene oxide, methylphenylethylene oxide, or mixture thereof. In another embodiment of the invention, mono-epoxide or multi-epoxide fat and oil, such as monoglycerides, diglycerides and triglycerides, may be used as alkylene oxides. In addition, epoxide fatty acids or $C_1$-$C_{24}$ esters thereof may also be used as alkylene oxides. In another embodiment of the invention, epichlorohydrin, glycidols or glycidyl derivatives such as methyl glycidyl ether, ethyl glycidyl ether, allyl glycidyl ether may be used as alkylene oxides.

According to an embodiment of the invention, the alkylene oxide for preparing the polyether carbonate polyol may be selected from the group consisting of ethylene oxide, propylene oxide, 1,2-butylene oxide, 2,3-butylene oxide, isobutylene oxide, epichlorohydrin, cyclohexene oxide, styrene oxide, polycarboxylic anhydrides and lactones or combinations thereof.

In a preferred embodiment of the invention, the alkylene oxide is selected from ethylene oxide, propylene oxide or a combination thereof, preferably propylene oxide.

An alkylene oxide and carbon dioxide are added onto a starter comprising active hydrogen atom(s) to prepare the polyether carbonate polyol used in the invention. The starter comprising active hydrogen atom(s) generally refers to a compound comprising hydrogen which is active in alkoxylation, such as a compound comprising —OH, —NH$_2$ (primary amino group), —NH (secondary amino group), —SH or —COOH, or a combination of such compounds. In a preferred embodiment, the starter comprising active hydrogen atom(s) refers to a compound comprising —OH or —NH$_2$, or a combination of such compounds, more preferably a compound comprising —OH. In an embodiment of the invention, the starter comprising active hydrogen atom(s) is selected from the group consisting of polyols, polyvalent amines, polyvalent thiols, polyester polyols, polyester ether polyols, polyether carbonate polyols, polycarbonate polyols, polycarbonates, polyethyleneimine, polyether amines (e.g. those available from Huntsman in the name of Jeffamine®), polytetrahydrofuran (e.g. those available from BASF in the name of PolyTHF®, such as Poly-THF® 250, 650S, 1000, 1000S, 1400, 1800, 2000), polyether thiols, polyacrylates or combinations thereof. In another embodiment of the invention, the starter comprising active hydrogen atom(s) may be castor oil, castor oil monoglyceride or castor oil diglyceride, fatty acid monoglyceride or triglyceride, and $C_1$-$C_{24}$ alkyl fatty acid ester or a combination thereof. Examples of $C_1$-$C_{24}$ fatty acid esters include Lupranol Balance® series products (BASF AG), Merginol® series products (Hobum Oleochemicals GmbH), Sovermol® series products (Cognis Germany GmbH & Co. KG), and Soyol® series products (USSC Co.).

A preferred starter comprising active hydrogen atom(s) is selected from the group consisting of methanol, ethanol, propanol, butanol, pentanol, hexanol, $C_7$-$C_{30}$ monohydric alcohol, ethylene glycol, diethylene glycol, triethylene glycol, propylene glycol, dipropylene glycol, tripropylene glycol, neopentyl glycol, 1,3-propanediol, 1,4-butanediol, 1,2-butanediol, 1,3-butanediol, 2,3-butanediol, 1,6-hexanediol, water, glycerin, trimethylolpropane, trimethylolethane, pentaerythritol, α-methylglucoside, sorbitol, mannitol, hydroxymethylglucoside, hydroxypropylglucoside, sucrose, 1,4-cyclohexanediol, cyclohexanedimethanol, hydroquinone, resorcinol and alkoxylates thereof. More preferably, the starter comprising active hydrogen atom(s) is selected from the group consisting of ethylene glycol, propylene glycol, glycerin and trimethylolpropane or combinations thereof.

In a preferred embodiment of the invention, the polyether carbonate polyol is prepared by addition of carbon dioxide and an alkylene oxide onto a starter comprising active hydrogen atom(s) in the presence of DMC catalyst. This preparation method is well known to those skilled in the art. For example, it is described in EP 0222453A, WO 2008/013731A and EP2115032A.

It is also well known to those skilled in the art that a dual metal cyanide (DMC) catalyst may be used for homopolymerization of alkylene oxide, as described in, for example, U.S. Pat. No. 3,404,109A, U.S. Pat. No. 3,829,505A, U.S. Pat. No. 3,941,849A and U.S. Pat. No. 5,158,922A. An example of the DMC catalyst useful in the invention includes but is not limited to zinc hexacyanocobaltate. The DMC catalyst exhibits good catalytic activity in homopolymerization of alkylene oxide. It has catalytic effect in the preparation of polyether polyol even at a very low catalyst concentration (25 ppm or lower).

Generally, the DMC catalyst has an amount of less than 1 wt. %, preferably less than 0.5 wt. %, more preferably less than 500 ppm, still preferably less than 300 ppm, based on 100% by weight of the polyether carbonate polyol.

The alkylene oxide and carbon dioxide may be added together or in sequence into a reactor, wherein carbon dioxide may be added to the reactor all in one time or in a batchwise manner along with the proceeding of the reaction. Preferably, an excessive amount of carbon dioxide is added. When more than one alkylene oxide is used for preparing a polyether carbonate polyol, these alkylene oxides may be added together or in sequence in the same batch or different batches. Depending on the manner in which alkylene oxide and carbon dioxide are added, the resultant polyether carbonate polyol may have a random, alternate, block or gradient polymeric structure.

Preferably, an excessive amount of carbon dioxide is used, wherein the amount of carbon dioxide may be measured via the reaction pressure. Due to the slow rate of the polymerization reaction, an excessive amount of carbon dioxide is preferably used. The polymerization reaction may be carried out at a temperature of 60-150° C., preferably 70-140° C., more preferably 80-130° C. The polymerization reaction may be carried out at a pressure of 0-100 bar, preferably 1-90 bar, more preferably 3-80 bar. When the reaction temperature is lower than 60° C., the polymerization rate will be rather slow; whereas a lot of byproducts will be produced when the reaction temperature is higher than 150° C.

The polyurethane resin composition of the invention may further comprise one or more polyols having a functionality of 2-6, wherein the polyols may be polyether polyols, polyester polyols, polymer polyols or combinations thereof. In a preferred embodiment of the invention, the resin composition of the invention further comprises (b2) one or more polyether polyols.

The polyether polyol excludes the polyether carbonate polyol (b1) as described above, and may be prepared by known processes, for example, by the reaction between an olefin oxide and a starter in the presence of a catalyst. The catalyst is preferably but not limited to an alkaline hydroxide, an alkaline alkoxide, antimony pentachloride, boron trifluoride-diethyl etherate or a mixture thereof. The olefin oxide is preferably but not limited to tetrahydrofuran, ethylene oxide, 1,2-propylene oxide, 1,2-butylene oxide, 2,3- butylene oxide, styrene oxide, or a mixture thereof. The starter is preferably, but not limited to, polyhydroxyl compound, which polyhydroxyl compound is preferably, but not limited to, water, ethylene glycol, 1,2-propylene glycol, 1,3-propylene glycol, diethylene glycol, trimethylolpropane or a mixture thereof.

The polyester polyol is prepared by the reaction between a dibasic carboxylic acid or a dibasic carboxylic anhydride and a polyol. The dibasic carboxylic acid is preferably but not limited to an aliphatic carboxylic acid having 2-12 carbon atoms, preferably but not limited to succinic acid, malonic acid, glutaric acid, adipic acid, suberic acid, azelaic acid, sebacic acid, dodecanoic acid, maleic acid, fumaric acid, phthalic acid, isophthalic acid, terephthalic acid, or a mixture thereof. The dibasic carboxylic anhydride is preferably but not limited to phthalic anhydride, tetrachlorophthalic anhydride, maleic anhydride or a mixture thereof. The polyol that reacts with the dibasic carboxylic acid or anhydride is preferably but not limited to ethylene glycol, diethylene glycol, 1,2-propylene glycol, 1,3-propylene glycol, dipropylene glycol, 1,3-methylpropylene glycol, 1,4-butylene glycol, 1,5-pentylene glycol, 1,6-hexylene glycol, neopentyl glycol, 1,10-decylene glycol, glycerine, trimethylolpropane, or a mixture thereof. The polyester polyol also includes a polyester polyol prepared from a lactone. The polyester polyol prepared from a lactone is preferably but not limited to ε-caprolactone. Preferably, the polyester polyol has a molecular weight of 1000-3000 and a functionality of 2.0-3.0.

The polymer polyol may be a polymer modified polyether polyol, preferably a grafted polyether polyol, and a polyether polyol dispersion. The grafted polyether polyol is preferably a styrene and/or acrylonitrile based grafted polyether polyol, wherein the styrene and/or acrylonitrile may be obtained by in situ polymerization of styrene, acrylonitrile, a mixture of styrene and acrylonitrile, wherein the ratio of styrene to acrylonitrile in the mixture of styrene and acrylonitrile is 90:10-10:90, preferably 70:30-30:70. The polymer polyol in the invention may also be bio-based polyols such as castor oil, wood tar or the like. The polymer polyether polyol dispersion comprises a dispersion phase, e.g. an inorganic filler, a polyurea, a polyhydrazide, a polyurethane comprising a bonded tertiary amino group and/or melamine. The dispersion phase has an amount of 1-50 wt. %, preferably 1-45 wt. %, based on 100% by weight of the polymer polyether polyol. Preferably, the polymer polyether polyol has a polymer solid content of 20%-45% based on 100% by weight of the polymer polyether and a hydroxyl number of 20-50 mgKOH/g. The methods for measuring hydroxyl number are well known to those skilled in the art and are disclosed by, for example, Houben Weyl, Methoden der Organischen Chemie, vol. XIV/2 Makromolekulare Stoffe, p. 17, Georg Thieme Verlag; Stuttgart 1963, which is incorporated herein in its entity by reference.

The polyurethane composition of the invention may further comprise a blowing agent which may be selected from various physical or chemical blowing agents, preferably but not limited to water, halogenated hydrocarbons, hydrocarbons, and gases. The halogenated hydrocarbons are preferably but not limited to chlorodifluoromethane, dichloromonofluoromethane, dichlorofluoromethane, trichlorofluoromethane, or mixtures thereof. The hydrocarbons are preferably but not limited to butane, pentane, cyclopentane, hexane, cyclohexane, heptane, or mixtures thereof. The gases are preferably but not limited to air, $CO_2$ or $N_2$. In an embodiment of the invention, the blowing agent has an amount of 0-0.2 wt. %, more preferably 0-0.05 wt. %, based on 100% by weight of the isocyanate-reactive component (b). In a particularly preferred embodiment of the invention, the polyurethane resin composition of the invention doesn't comprise blowing agent.

In an embodiment of the invention, the blowing agent is selected from water, wherein the amount of water is preferably 0-0.2 wt. %, more preferably 0-0.05 wt. %, most preferably 0, based on 100% by weight of the isocyanate-reactive component (b). In a particularly preferred embodiment of the invention, the polyurethane resin composition of the invention does not comprise water that is added for the purpose of blowing. It is to be noted that water used as a blowing agent may be the water contained in the other components of the resin composition, or the water added specially to be used as the blowing agent.

The polyurethane composition of the invention may also comprise a chain extender and/or a cross-linker. A suitable chain extender useful for the invention has a molecular weight that is generally less than 399, and a functionality of 2-6, preferably 2-4. The chain extender and/or the cross-linker generally comprise hydroxyl, amino, mercapto or a combination thereof, and generally comprise 2-8 isocyanate-reactive hydrogen atoms, preferably 2-4 isocyanate-reactive hydrogen atoms.

Suitable examples of the chain extender useful for the invention include: ethylene glycol, 1,2-propylene glycol, 1,3-propylene glycol, 1,3-butylene glycol, 1,4-butylene glycol, 2,3-butylene glycol, 1,6-hexylene glycol, 1,8-octylene glycol, 1,10-decylene glycol, neopentyl glycol, 1,3-dimethylolcyclohexane, 1,4-dimethylolcyclohexane, 2-methyl-1,3-propylene glycol, diethylene glycol, triethylene glycol, tetraethylene glycol, polyethylene glycol, dipropylene glycol, tripropylene glycol, polypropylene glycol, dibutylene glycol, tributylene glycol, polybutylene glycol, N-methyl-diethanolamine, cyclohexane dimethanol, 2-methyl-1,3-propylene glycol, 2,2,4-trimethyl-pentane-1,3-diol, trimethylolpropane, pentaerythritol, glycerine, and low molecular polyether polyols derived from glycerine and propylene oxide. Other suitable chain extenders include polyether polyols derived from amines as starters, for example, ethylene diamine, toluene diamine, monoethanolamine, diethanolamine and triethanolamine.

The chain extender has an amount of 0-50%, preferably 5-40%, more preferably 10%-30%, based on 100% by weight of the isocyanate-reactive component.

The polyurethane composition of the invention may also comprise conventional additives in the art, for example, fillers, internal mold releasing agents, flame retardants, smoke suppressants, dyes, pigments, antistatic agents, antioxidants, UV stabilizers, viscosity reducers, antifoaming agents, coupling agents, surface wetting agents, leveling agents, dewatering agents, or combinations thereof. In some embodiments of the invention, part or all of the additives may be applied on the reinforcement material, for example, coated on the reinforcement material.

Suitable fillers include but not limited to calcium sulfate, barium sulfate, clay, aluminum hydroxide, antimony pentoxide, powdered glass fiber, wollastonite, talc, mica, sheet glass, silicon dioxide, titanium dioxide, molecular sieves, micro powder polyethylene, hollow or solid glass beads or ceramic beads or combinations thereof.

Useful internal mold releasing agents include any conventional mold releasing agents for manufacturing polyurethanes, and their examples include long-chain carboxylic acids, particularly fatty acids, such as stearic acid, amines of long-chain carboxylic acids (such as stearamide), fatty acid esters, metal salts of long-chain carboxylic acids (such as zinc stearate), or polysiloxanes.

Examples of useful viscosity reducers include γ-butyrolactone, propylene carbonate and reactive diluents, such as dipropylene glycol, diethylene glycol and tripropylene glycol.

Examples of useful flame retardants include triaryl phosphates, trialkyl phosphates, triaryl or trialkyl phosphates containing halogen, melamine, melamine resin, halogenated paraffin, or combinations thereof.

Other additives useful for the polyurethane resin composition of the invention include dewatering agents, such as molecular sieves; antifoaming agents, such as polydimethylsiloxane; coupling agents, such as monoethylene oxide or organoamine functionalized trialkoxysilane or combinations thereof. A coupling agent is particularly preferably used to enhance the binding strength between a resin matrix and a fibrous reinforcement material. A fine filler, for example, clay and fine silicon dioxide, is usually used as a thixotropic agent.

The polyurethane resin composition of the invention has an appropriate reactivity, i.e. an appropriate gel time. The gel time is determined herein as follows: the polyurethane composition is agitated at room temperature in a centrifugal agitator at 2000 rpm for 1 minute, and then the gel time is measured using a gel instrument. Time is counted when the agitation is started. The gel instrument useful for the invention may be, for example, GTS-THP available from Paul N. Gardner, Co., USA.

The gel time of the polyurethane resin composition of the invention at 25° C. is generally 40 seconds to 48 hours, preferably 1 minute to 24 hours, more preferably 2 minutes to 4 hours.

The polyurethane resin matrix prepared from the polyurethane composition of the invention has a tensile strength of 5-120 MPa, preferably 30-100 MPa, more preferably 50-90 MPa; a tensile modulus of 500-6000 MPa, preferably 1500-5000 MPa, more preferably 2000-4500 MPa; a bend strength of 10-250 MPa, preferably 30-230 MPa, more preferably 50-180 MPa; a tensile elongation at break of 0.5-150%, preferably 0.5-50%, more preferably 1-10%; a hardness of Shore A 20-Barcol hardness 70Hba, preferably Shore A 40-Barcol hardness 60Hba, more preferably Shore A 50-Barcol hardness 50Hba.

In still another aspect, the invention relates to a use of the polyurethane resin composition described above for preparing the polyurethane composite. Further, the polyurethane composite may be a wind turbine blade, a yacht shell, etc., which are made by a vacuum infusion process; a constant cross-section profile material made by a pultrusion process, for example, a window frame, a door frame, a ladder frame, a telegraph pole cross arm, a tent pole, a solar cell frame, a solar cell backsheet, a radome, a highway guard rail, a floor board, etc.; and a product made by other processes, for example, various pipes, a telegraph pole, auto vehicle spare parts (e.g. an auto trunk, a luggage holder, an engine cover), a golf club, a tennis pole, a badminton pole, a bicycle frame, a surfboard, a snowboard, etc.

Polyurethane Composite

In another aspect, the invention relates to a polyurethane composite, comprising
(I) a polyurethane resin matrix which is prepared from the polyurethane resin composition described above and has a density of 0.8-1.2 kg/m$^3$; and
(II) a reinforcement material.

A suitable reinforcement material useful for the invention includes but is not limited to glass fibers, carbon fibers, polyester fibers, natural fibers, aramid fibers, nylon fibers, basalt fibers, boron fibers, silicon carbide fibers, asbestos fibers, whiskers, hard particles, metal wires, or combinations thereof. Depending on the preparation process and the property requirements, the reinforcement material may take the form of a flake or fiber shape.

In an embodiment of the invention, the reinforcement material preferably has an amount of 5-95 wt. %, more preferably 30-95 wt. %, most preferably 50-90 wt. %, based on 100% by weight of the polyurethane composite.

The polyurethane composite of the invention may be prepared by a conventional process in the art, for example, pultrusion, infusion, filament winding, resin transfer molding, hand lay-up, compression molding, spray up molding, continuous lamination, or combinations thereof.

In a preferred embodiment of the invention, the polyurethane composite of the invention is obtained by a vacuum infusion process. Correspondingly, the reinforcement material may be selected from fiber reinforcement materials. The fiber reinforcement materials used may include any type of fiber woven products. In a preferred embodiment of the invention, examples of the fiber reinforcement materials include but not limited to glass fibers, glass fiber meshes, carbon fibers, polyester fibers, natural fibers, aramid fibers, basalt fibers, nylon fibers, or a combination thereof, preferably carbon fibers or glass fibers.

The polyurethane composite may be a wind turbine blade, a yacht shell, etc., which are made by a vacuum infusion process; a constant cross-section profile material made by a pultrusion process, for example, a window frame, a door frame, a ladder frame, a telegraph pole cross arm, a tent pole, a solar cell frame, a solar cell backsheet, a radome, a highway guard rail, a floor board, etc.; and a product made by other processes, for example, various pipes, a telegraph pole, auto vehicle spare parts (e.g. an auto trunk, a luggage holder, an engine cover), a golf club, a tennis pole, a badminton pole, a bicycle frame, a surfboard, a snowboard, etc.

Process for Preparing the Polyurethane Composite

In still another aspect, the invention provides a process of preparing the polyurethane composite as described above, comprising the steps of:
(I) impregnating the reinforcement material with the polyurethane resin composition described above; and
(II) reacting the polyurethane resin composition described above to obtain the polyurethane resin matrix.

The polyurethane composite of the invention may be prepared by a conventional process in the art, for example, infusion, pultrusion, filament winding, resin transfer molding (RTM), hand lay-up, compression molding, spray up molding, continuous lamination, etc. Suitable reinforcement materials and preparation processes may be selected by those skilled in the art according to the property requirements of the desired products.

In a preferred embodiment of the invention, the polyurethane composite of the invention is obtained by a vacuum infusion process for polyurethane. The operation of a vacuum infusion process for polyurethane is well known to those skilled in the art, and is described, for example, in the disclosure of CN 1954995A, the content of which is incorporated herein in its entity by reference.

In the vacuum infusion process for polyurethane, a reinforcement material and a diversion material are laid upon a mold first. Then, a resin diversion line and a vacuum line are laid. Subsequently, a vacuum bag is laid. A vacuum pump is connected, and the hermeticity of the system is checked.

Afterwards, an organic polyisocyanate and an isocyanate-reactive component which have been degassed are guided into a mixing/metering instrument at a desired ratio. Then, the polyurethane resin is infused into the mold via the reduced pressure in the mold. The polyurethane resin will impregnate the reinforcement material by degrees before it is cured. After the reinforcement material is impregnated completely, the polyurethane resin is cured at room temperature or by heating to form a polyurethane resin matrix, obtaining a polyurethane composite.

In the above vacuum infusion process, the mold may be a conventional mold in the art. The mold may be selected by those skilled in the art according to the desired properties and dimensions of the final product.

In a preferred embodiment of the invention, the polyurethane composite of the invention is obtained by a vacuum infusion process. Correspondingly, the reinforcement material may be selected from fiber reinforcement materials. The fiber reinforcement materials used may include any type of fiber woven products. In a preferred embodiment of the invention, the fiber reinforcement materials include glass fibers, glass fiber meshes, carbon fibers, polyester fibers, natural fibers, aramid fibers, basalt fibers, nylon fibers, or a combination thereof, preferably carbon fibers or glass fibers.

EXAMPLES

The invention will be further illustrated with reference to the following specific examples. However, it is to be appreciated that these examples are only intended to illustrate the invention without limiting the scope of the invention. The test methods in the following examples for which no specific conditions are indicated will be carried out generally under conventional conditions or under those conditions suggested by the manufacturers. All percentages and parts are based on weight unless otherwise specified.

The raw materials used in the examples are listed as follows:

Isocyanate: Desmodur 1511L, isocyanate group content: 31.4 wt. %, average functionality: 2.7, available from Bayer MaterialScience Co.;

Polyether polyol 1: a polyol having a functionality of 2, prepared using 1,3-propylene glycol as a starter and propylene oxide and ethylene oxide as the main polymerization components, hydroxyl number: 28 KOH/g;

Polyether polyol 2: a polyol having a functionality of 2, prepared using 1,2-propylene glycol as a starter, a dual metal cyanide (DMC) as a catalyst, and propylene oxide as the main polymerization component, hydroxyl number: 28 KOH/g;

Polyether polyol 3: a polyol having a functionality of 3, prepared using glycine as a starter, and propylene oxide as the main polymerization component, hydroxyl number: 470 KOH/g;

Polyether carbonate polyol 1: prepared by the reaction between carbon dioxide and propylene oxide, functionality: 2, average molecular weight: 2000, hydroxyl number: 56 mgKOH/g, content of incorporated carbon dioxide in the form of carbonate units: 16 wt. %;

Polyether carbonate polyol 2: prepared by the reaction between carbon dioxide and propylene oxide, functionality: 2, average molecular weight: 4000, hydroxyl number: 28 mgKOH/g, content of incorporated carbon dioxide in the form of carbonate units: 16 wt. %;

BAYLITH L-paste: molecular sieve, available from Shanghai Huanqiu Molecular Sieve Co., Ltd;

Unidirectional glass fiber cloth: (X) 14EU970-01190, glass fiber content in lateral direction: 3%, available from Saertex Co.;

Test Methods used in the Invention:

Hardness of resin and composite material: National Standard GB/T 3854-2005;

Test standard for bend strength of resin: EU Standard ISO 178;

Test standard for tensile strength of resin: EU Standard ISO 527-2;

Test standard for bend strength of composite: EU Standard ISO 14125.

In the following examples, the isocyanate index is shown as follows:

$$X(\%) = \frac{[\text{moles of isocyanate group } (NCO \text{ group}) \text{ in Component } A]}{[\text{moles of isocyanate-reactive group in Component } B]} \times 100\%$$

wherein component A refers to the organic isocyanate component, and component B refers to all the other components except for the organic isocyanate component.

Examples 1-2: Polyurethane Resin Compositions

First of all, a casting mold was placed in an oven at 100° C. Then, the components listed in Table 1 were poured proportionally into a cup, and mixed sufficiently for 20 minutes using a centrifugal agitator at 2000 rpm. Subsequently, the resin was poured into the mold, and cured at 100° C. for 2 hours to obtain the polyurethane resin matrices of Comparative Examples 1-2 and Examples 1-2.

TABLE 1

Polyurethane resin compositions and mechanical properties thereof

| | | Examples | | | |
|---|---|---|---|---|---|
| | | Comparative Example 1 | Comparative Example 2 | Example 1 | Example 2 |
| Component B | Polyether polyol 1 | 20 | | | |
| | Polyether polyol 2 | | 20 | | |
| | Polyether carbonate polyol 1 | | | 20 | |
| | Polyether carbonate polyol 2 | | | | 20 |

TABLE 1-continued

Polyurethane resin compositions and mechanical properties thereof

|  |  | Examples | | | |
|---|---|---|---|---|---|
|  |  | Comparative Example 1 | Comparative Example 2 | Example 1 | Example 2 |
| Component A | Polyether polyol 3 | 80 | 80 | 80 | 80 |
|  | BAYLITH L- paste | 4 | 4 | 4 | 4 |
|  | Desmodur 1511L | 100.1 | 100.1 | 101.6 | 100.1 |
| Isocyanate index (%) |  | 110 | 110 | 110 | 110 |
| Reactivity | Gel time | 154 minutes | 156 minutes | 141 minutes | 138 minutes |
|  | Temperature/° C. | 23 | 23 | 23 | 23 |
| Mechanical properties | Barcol hardness (Hba) | 28 | 5 | 38 | 38 |
|  | Bending modulus (MPa) | 2559 | 2334 | 3042 | 2748 |
|  | Bend strength (MPa) | 99 | 98 | 118 | 116 |
|  | Tensile modulus (MPa) | 2734 | 2642 | 2998 | 2879 |
|  | Tensile strength (MPa) | 66 | 62 | 74 | 73 |
|  | Tensile elongation at break (%) | 3.2 | 3.0 | 3.6 | 3.4 |

Comparison between the Comparative Examples and the Examples demonstrates that, at the same cross-linking density, the introduction of a polyether carbonate polyol can improve the mechanical properties of a polyurethane resin matrix significantly, such as bending properties, tensile properties, hardness and the like, while its toughness remains substantially unchanged. In addition, the gel times of the polyurethane resin compositions in Examples 1 and 2 are similar to those of the Comparative Examples, indicating substantially no influence of the introduction of a polyether carbonate polyol into a polyurethane resin composition on its reactivity, i.e. substantially no influence on the molding process of the polyurethane composite.

Example 3: Polyurethane Composite and Preparation Thereof

Component B listed in Table 2 was mixed sufficiently, and then the homogeneously mixed polyol component and the isocyanate component were degassed separately under a vacuum negative pressure of 0.1 MPa for two hours. Subsequently, the degassed polyol component and isocyanate component were mixed proportionally for 2 minutes using a centrifugal agitator at 2000 rpm. Then, the polyurethane resin was infused into a unidirectional glass fiber cloth under a vacuum negative pressure. After the resin impregnated the glass fiber thoroughly, the vacuum pump was shut down, and both the inlet pipe and the outlet pipe were clamped to hold the pressure for 24 hours. Finally, the vacuum infusion plate was placed in an oven at 100° C. to cure for 4 hours, followed by cooling and cutting.

TABLE 2

Polyurethane composite and mechanical properties thereof

|  |  | Examples | |
|---|---|---|---|
|  |  | Comparative Example 3 | Example 3 |
| Component B | Polyether polyol 2 | 20 |  |
|  | Polyether carbonate polyol 1 |  | 20 |

TABLE 2-continued

Polyurethane composite and mechanical properties thereof

|  |  | Examples | |
|---|---|---|---|
|  |  | Comparative Example 3 | Example 3 |
| Component A | Polyether polyol 3 | 80 | 80 |
|  | L- paste | 4 | 4 |
|  | Desmodur 1511L | 100.1 | 100.1 |
| Isocyanate index (%) | Isocyanate index | 110 | 110 |
| Mechanical properties | Barcol hardness (Hba) | 70 | 70 |
|  | Longitudinal bend strength (MPa) | 1071 | 1278 |
|  | Lateral bend strength (MPa) | 140 | 157 |

As indicated by Table 2, the polyurethane resin composites of Comparative Example 3 and Example 3 were prepared from the polyurethane resin compositions of Comparative Example 2 and Example 2 respectively, using a vacuum infusion process. When Comparative Example 3 and Example 3 are compared, it can be found that the longitudinal/lateral bending strengths of Example 3 are 19%/12% higher than those of Comparative Example 3, respectively, indicating that a polycarbonate polyol can improve not only the mechanical properties of a polyurethane composition remarkably, but also the mechanical properties of a polyurethane composite prepared therefrom.

What is claimed is:
1. A polyurethane composite comprising:
(I) a polyurethane resin matrix prepared from a polyurethane resin composition having a gel time of 40 seconds to 48 hours, comprising:
(a) an organic polyisocyanate;
(b) an isocyanate-reactive component comprising:
(b1) 5-50 wt. % of one or more polyether carbonate polyols, based on 100% by weight of the isocyanate-reactive component, which is prepared by addition of carbon dioxide and alkylene oxides onto a starter comprising active hydrogen atom(s)

in the presence of a DMC catalyst, wherein said polyol has a functionality of 2-6, a hydroxyl number in the range from 10 to 500 mg KOH/g, and a content of incorporated carbon dioxide in the form of carbonate units of 3-70 wt. % based on 100% by weight of the polyether carbonate polyol; and (c) 0-0.2 wt. % of a blowing agent, based on 100% by weight of the isocyanate-reactive component (b) selected from the group consisting of water, chlorodifluoromethane, dichloromono:fluoromethane, dichlorodifluoromethane, trichloromono:fluoromethane, butane, pentane, cyclopentane, hexane, cyclohexane, heptane, air, C02, N2 and combinations thereof, wherein the polyurethane resin matrix has a density of 0.8-1.2 kg/m$^3$; and (II) a reinforcement material.

2. The polyurethane composite according to claim 1, wherein the polyurethane composite is prepared by a process of infusion, pultrusion, filament winding, resin transfer molding, hand lay-up, compression molding, spray up molding, continuous lamination, or combinations thereof.

3. The polyurethane composite according to claim 1, wherein the reinforcement material is selected from the group consisting of glass fibers, carbon fibers, polyester fibers, natural fibers, aramid fibers, nylon fibers, basalt fibers, boron fibers, silicon carbide fibers, asbestos fibers, whiskers, hard particles, metal wires, and combinations thereof.

4. A process of preparing polyurethane composite according to claim 1 which comprises a polyurethane resin matrix and a reinforcement material, comprising the steps of:

(I) impregnating a reinforcement material with a polyurethane resin composition; and (II) reacting the polyurethane resin composition to obtain the polyurethane resin matrix.

5. The polyurethane composite according to claim 1, wherein the polyether carbonate polyol has a content of incorporated carbon dioxide in the form of carbonate units of 5-35 wt %, based on 100% by weight of the polyether carbonate polyol.

6. The polyurethane composite according to claim 1, wherein the polyether carbonate polyol has a functionality of 2-4.

7. The polyurethane composite according to claim 1, wherein the polyether carbonate polyol has a hydroxyl number of 10-400 mg KOH/g.

8. The polyurethane composite according to claim 1, wherein the blowing agent has an amount of 0-0.05 wt. %, based on 100% by weight of the isocyanate-reactive component (b).

9. The polyurethane composite according to claim 1, wherein the starter comprising active hydrogen atom(s) is selected from the group consisting of methanol, ethanol, propanol, butanol, pentanol, hexanol, C7-C30 monohydric alcohol, ethylene glycol, diethylene glycol, triethylene glycol, propylene glycol, dipropylene glycol, tripropylene glycol, neopentyl glycol, 1,3-propanediol, 1,4-butanediol, 1,2-butanediol, 1,3-butanediol, 2,3-butanediol, 1,6-hexanediol, water, glycerin, trimethylolpropane, trimethylolethane, pentaerythritol, α-methylglucoside, sorbitol, mannitol, hydroxymethylglucoside, hydroxypropylglucoside, sucrose, 1,4-cyclohexanediol, cyclohexanedimethanol, hydroquinone, resorcinol and alkoxylatesthereof.

10. The polyurethane composite according to claim 9, wherein the starter comprising active hydrogen atom(s) is selected from the group consisting of ethylene glycol, propylene glycol, glycerin, trimethylolpropane and combinations thereof.

11. The polyurethane composite according to claim 1, wherein the alkylene oxide is selected from the group consisting of ethylene oxide, propylene oxide, 1,2-butylene oxide, 2,3-butylene oxide, isobutylene oxide, epichlorohydrin, cyclohexene oxide, styrene oxide, polycarboxylic anhydrides, lactones and combinations thereof.

12. The polyurethane composite according to claim 11, wherein the alkylene oxide is selected from the group consisting of ethylene oxide, propylene oxide, and a combination thereof.

13. The polyurethane composite according to claim 1, wherein the component (b) further comprises (b2) one or more polyether polyols.

14. The polyurethane composite according claim 1, further comprising one or more components selected from the group consisting of chain extenders, fillers, internal mold releasing agents, flame retardants, smoke suppressants, dyes, pigments, antistatic agents, antioxidants, UV stabilizers, diluents, antifoaming agents, coupling agents, surface wetting agents, leveling agents, dewatering agents, catalysts, molecular sieves and combinations thereof.

* * * * *